United States Patent
Lai et al.

(10) Patent No.: US 6,814,622 B1
(45) Date of Patent: Nov. 9, 2004

(54) ELECTRICAL CONNECTOR ADAPTABLE TO FLASH MEMORY CARDS OF DIFFERENT SPECIFICATIONS

(75) Inventors: Ming-Chun Lai, Tucheng (TW); Chia-Sheng Su, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 10/761,269

(22) Filed: Jan. 22, 2004

(51) Int. Cl.⁷ .............................................. H01R 24/00
(52) U.S. Cl. ........................................................ 439/631
(58) Field of Search ................................ 439/630, 631, 439/260, 325, 632

(56) References Cited

U.S. PATENT DOCUMENTS

| | | | | |
|---|---|---|---|---|
| 6,126,486 A | * | 10/2000 | Chang | 439/630 |
| 6,146,195 A | * | 11/2000 | Chang | 439/630 |
| 6,244,902 B1 | * | 6/2001 | McDowell et al. | 439/630 |
| 6,716,066 B1 | * | 4/2004 | Kuo | 439/630 |
| 6,721,186 B2 | * | 4/2004 | Yang | 439/325 |
| 6,746,280 B1 | * | 6/2004 | Lu et al. | 439/630 |
| 6,749,450 B1 | * | 6/2004 | Chen | 439/630 |

* cited by examiner

*Primary Examiner*—Gary Paumen
*Assistant Examiner*—Briggitte R. Hammond
(74) *Attorney, Agent, or Firm*—Rosenberg, Klein & Lee

(57) ABSTRACT

An electrical connector includes an insulation housing, conductive terminals, first spring arms, second spring arms, solder legs, a circuit board and several retaining portions. A memory card slot is formed in the housing which adapted to receive the flash memory cards of different types. Each conductive terminal includes a spring portion and a solder portion. The solder portions of the conductive terminals and the solder legs are disposed on the lateral of the housing of the electrical connector. The solder portions of the conductive terminals are soldered on a main board for conducting the electronic signals between the flash memory cards and the main board. The solder legs are soldered on the main board to connect the circuit on the circuit board with the main board for transmitting the electronic signals between the flash memory cards and the circuit board. The first and second spring arms are mounted on the circuit board and utilized to resiliently contact with the terminals of flash memory cards while a flash memory card has inserted in the memory card slot. The first spring arms, the second spring arms and conductive terminals of the electrical connector are respectively coupled to the first, second and third types of the flash memory cards.

4 Claims, 4 Drawing Sheets

ELECTRICAL CONNECTOR ADAPTABLE TO FLASH MEMORY CARDS OF DIFFERENT SPECIFICATIONS

BACKGROUND OF THE INVENTION

1. Field of the Invention

The present invention generally relates to the field of an electrical connector, and in particular to an electrical connector adaptable to different formats of flash memory card.

2. The Related Art

Flash memory cards are generally used in the field of information appliance by virtue of the convenience of data storage and transmission. The characteristics of plug-and-play and carry easily make silicon disks become popular data storage media in the market. Flash memory cards have been used in multiple consumer products such as a personal digital assistance (PDA), a digital still camera, a multimedia player (MP3 player) etc.

Nowadays, flash memory cards have several prevailing specifications in the market. Related products include at least: CF cards (Compact-Flash cards), SM cards (Smart Media cards), MMC cards (Multi-Media Cards), MS cards (Memory Stick cards), SD cards(Secure Digital cards) and xD Picture cards (eXtreme Digital Picture cards) etc. Aforementioned types of flash memory cards are mostly incompatible mutually. The different specifications of flash memory cards result the inconvenience of the consumers. The consumers have to take additional efforts for reading and writing the data stored in flash memory cards of different specifications, for example, purchasing and installing several card readers.

In order to solve above problems, multi-card readers can be used to read and write flash memory cards with different specifications, however, conventional multi-card readers are equipped with a plurality of connecters to receive each flash memory cards of different specifications, this causes complexity of assembly and higher cost of products. Some multi-card readers are equipped with multi-card connector to receive at least two types of flash memory cards, but the complex wiring and the dense terminals of the connector increase the difficulties and the costs of the manufacture.

SUMMARY OF THE INVENTION

It is therefore a primary objective of the present invention to provide an electrical connector which adaptable to flash memory cards of different specifications. More specifically, an electrical connector is equipped with a circuit board for leading the conductive paths of terminals to the predetermined locations.

Another object of the present invention is to provide an electrical connector which adaptable to several types of flash memory cards, the solder legs of the connector are disposed at the lateral of the connector. The easy assembly and low cost of manufacture can be achieved by setting the solder legs at the lateral of the connector.

To achieve the above objects, in accordance with the present invention, there is provided an electrical connector comprising a housing suitable for receiving several types of flash memory cards, a circuit board for leading the conductive paths of terminals to the predetermined locations, a plurality of spring arms for contacting with the respectively metal terminals of flash memory cards, and a plurality of solder legs disposed at the lateral of the connector.

It is an advantage of the present invention that the circuit board for leading the conductive paths of terminals to the predetermined locations minimizing the complexity of designing of the connector housing and contact terminals, and improving the precision of alignment in the combination of housing, circuit board, spring arms and solder legs.

It is a further advantage of the present invention that the cost and difficulty of the rework or inspection of the connector can be minimized by disposing the soldering legs of the connector at the lateral of the connector.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
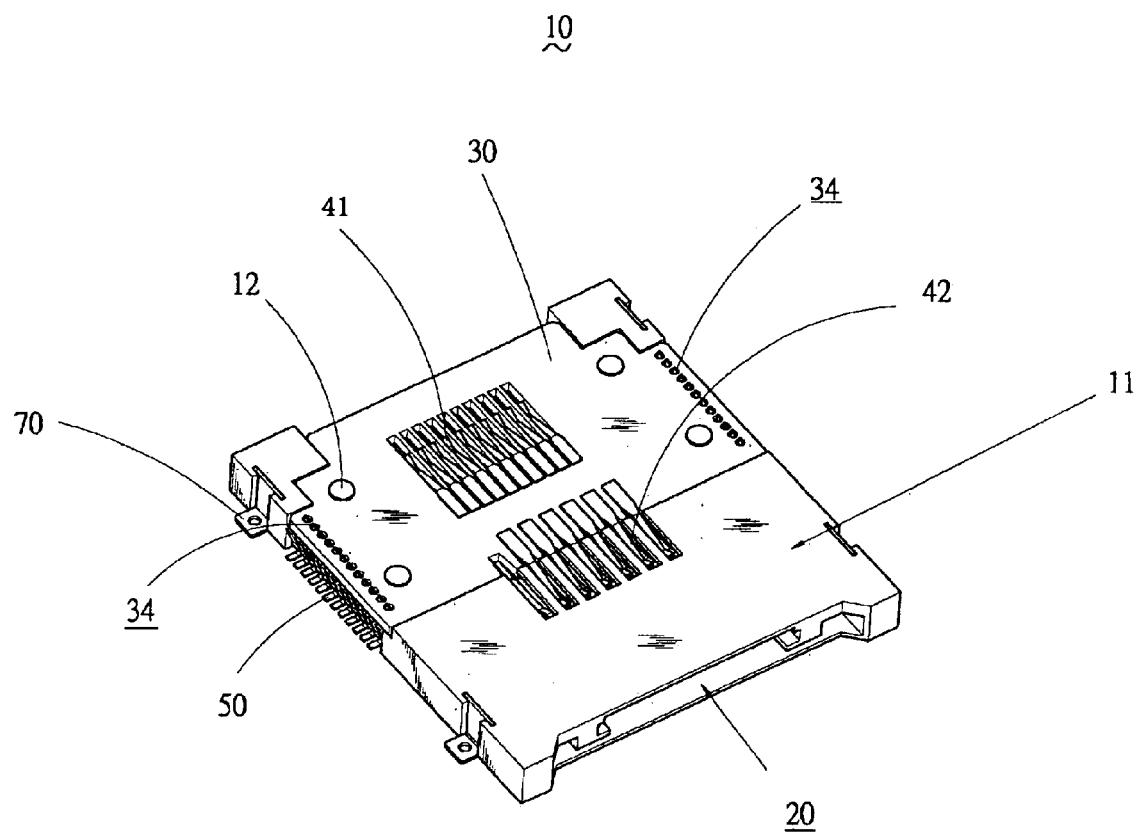
FIG. 1 is a perspective view of an electrical connector constructed in accordance with the present invention.

Please refer to FIG. 1 illustrating a perspective view of an electrical connector 10 according to the present invention. The connector 10 comprises a housing 11, a plurality of spring arms 41, 42, a plurality of solder legs 50, several retaining portions 70 and a circuit board 30. A multi-cards slot 20 is formed in the housing 11 in order to receive memory cards of different types respectively. The retaining portions 70 are attached to the lateral of the connector 10 for fastening the connector 10 on a main board (not shown). A plurality of solder holes 34 are disposed on the circuit board 30 for soldering the solder legs 50 with the circuit board 30.

Figure 2:
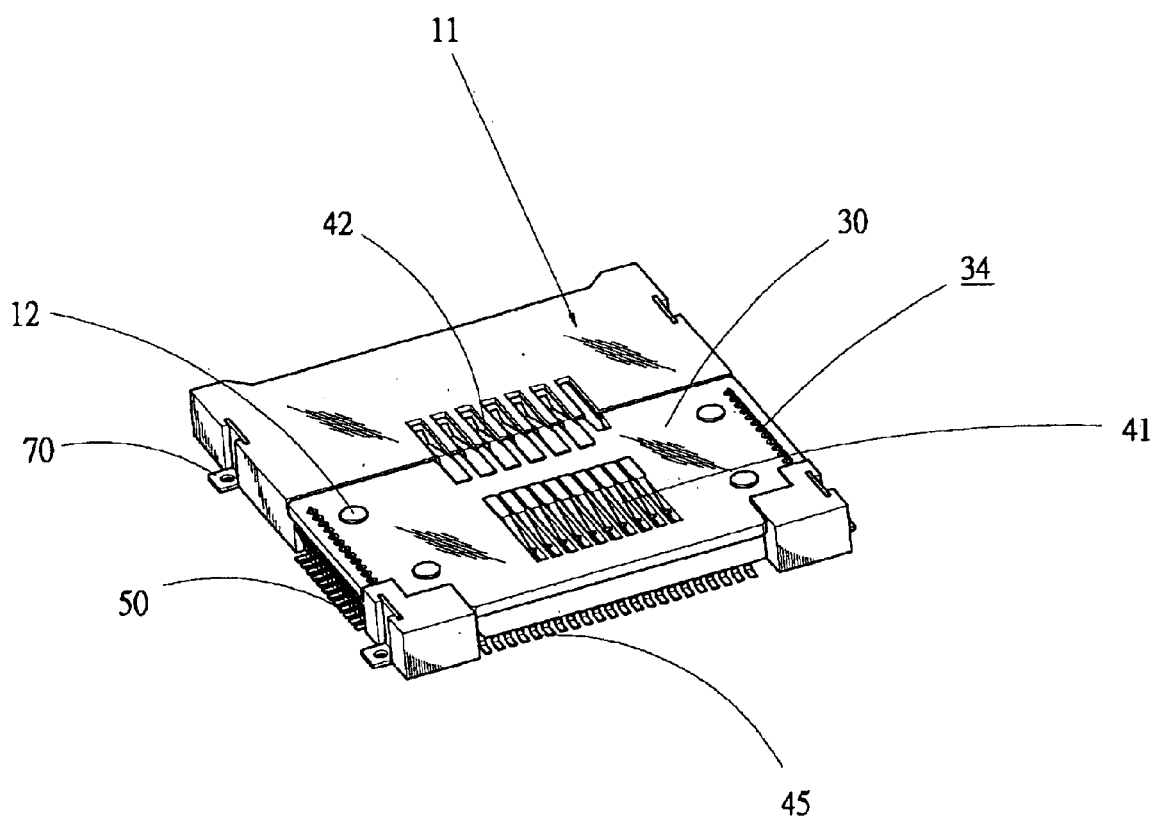
FIG. 2 is a perspective view of the electrical connector according to the present invention viewing from the rear side.
Figure 3:
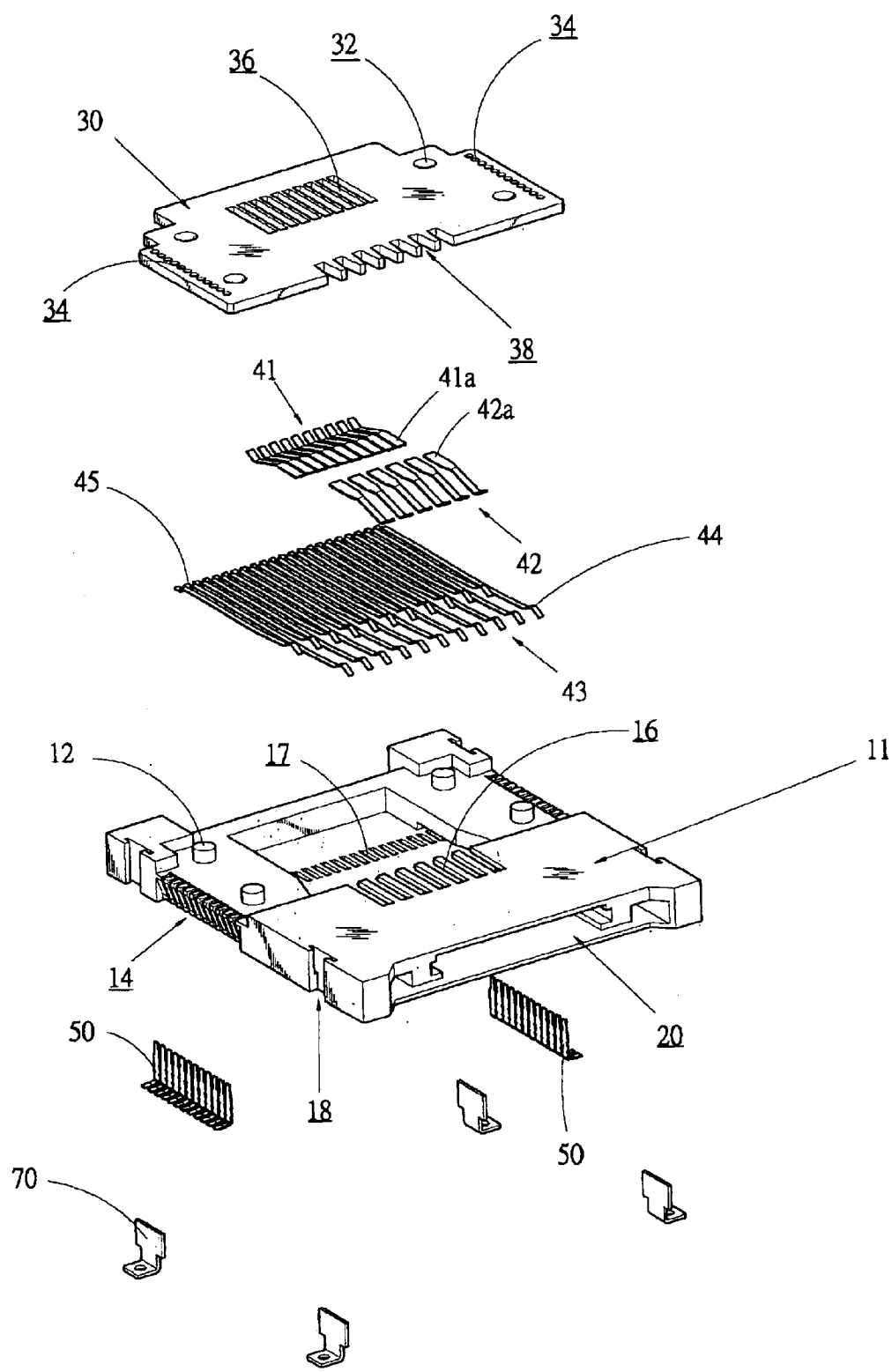
FIG. 3 is an exploded view of the electrical connector in accordance with the present invention.

With reference to the drawings and in particular to FIG. 2 and FIG. 3, FIG. 2 is the perspective view of the electrical connector according to the present invention viewed from the rear side and FIG. 3 is the exploded view of the electrical connector in accordance with the present invention. The connector 10 comprises a plurality of terminals 43, the terminals 43 are adapted to the first type of memory cards, for example, the SM cards (Smart Media cards). Each terminal 43 includes a spring portion 44 and a solder portion 45. The spring portions 44 are utilized to resiliently contact with the terminals of the first type of memory cards, and the solder portions 45 are utilized to solder the terminals 43 on the main board. The spring arms 41, 42 respectively include the mounting portions 41a, 42a. The mounting portions 41a, 42a are utilized to mount the spring arms 41, 42 on the predetermined positions of the circuit board 30. The spring arms 41 are utilized to resiliently contact with the terminals of the second type of memory cards, for example, the Memory Stick cards. Similarly, the spring arms 42 are utilized to resiliently contact with the terminals of the third type of memory cards, such as the MMC cards (Multi-Media Cards) or SD cards (Secure Digital cards).

The housing 11 further comprises solder leg retaining grooves 14, spring arm retaining grooves 16, terminal aligning trenches 17 and retaining notches 18. The solder legs 50 are disposed in the solder legs retaining grooves 14 of the housing 11 respectively. The retaining notches 18 are used to accept and fix the retaining portion 70 in the cause of fixing the connector 10 on the main board. The spring arm retaining grooves 16 are used to retain the spring arms 42 in the predetermined positions of the housing 11. The circuit board 30 has a plurality of alignment holes 32. More than one alignment portion 12 are formed on the housing 11 which coupled to the alignment holes 32 for aligning the circuit board 30 on the predetermined position of the housing 11.

The circuit board 30 is provided with the electrical wiring which couples the first spring arms and second spring arms with the respective portions of a circuit on the main board. The circuit board 30 comprises solder holes 34, spring arm retaining holes 36 and spring arm retaining grooves 38. The solder holes 34 are utilized to solder the solder legs 50 with the circuit board 30 for connecting the circuits on the circuit board 30 with that of the main board. The spring arm retaining holes 36 are designed for confining the spring arm 41 in the predetermined areas. The spring arm retaining grooves 38 retain the mounting portion 42a of the spring arm 42 on the solder position of the circuit board 30.

Figure 4:
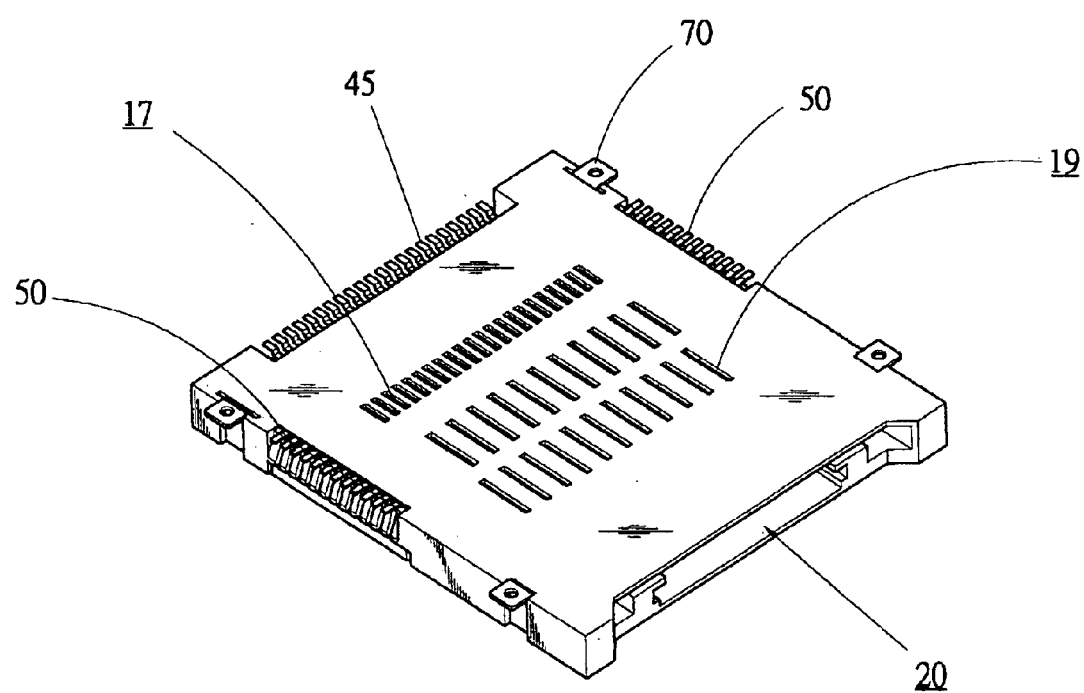
FIG. 4 is a bottom view of the electrical connector according to the present invention.

Also referring to FIG. 4, FIG. 4 is the bottom view of the electrical connector according to the present invention. The housing 11 also includes terminal aligning trenches 17 and spring portion aligning trenches 19 on the bottom of the housing 11. The terminal aligning trenches are used to fix the terminal 43 on the predetermined position of the housing 11. The spring portion aligning trenches 19 are utilized to confine the spring position 44 of the terminal 43 on the predetermined area of the housing 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electrical connector comprising:

an insulation housing;

conductive terminals received and retained in the housing, each conductive terminal including a spring portion and a solder portion;

a plurality of first spring arms, each first spring arm including a mounting portion;

a plurality of second spring arms, each second spring arm including a mounting portion;

a circuit board provided with the electrical wiring which couples the first spring arms and second spring arms with the respective portions of a circuit on a main board;

a plurality of alignment portions disposed on the housing;

a plurality of aligning holes formed on the circuit board accommodating to the alignment portions;

a plurality of solder legs formed on the housing connecting the wiring of the circuit board with the main board;

a plurality of solder holes formed on the circuit board receiving the solder legs and soldered therewith; and a multi-cards slot formed in the housing adapted to at least two types of flash memory cards;

wherein conductive terminals, the first spring arms and second spring arms disposed on the lateral of the electrical connector and respectively adapted to a first type, a second type and a third type of flash memory cards.

2. The electrical connector as claimed in claim 1, wherein the first type of flash memory card is the Smart Media card, the second type of flash memory card is the Memory Stick card and the third type of flash memory card is the Secured Digital card.

3. The electrical connector as claimed in claim 1, wherein the first type of flash memory card is the Smart Media card, the second type of flash memory card is the Memory Stick card and the third type of flash memory card is the Multi-Media Card.

4. The electrical connector as claimed in claim 1, wherein the electrical connector further comprising a plurality of retaining portions fixed in the retaining notch of the housing for fastening the electrical connector on the predetermined position on the main board.

* * * * *